United States Patent
Stephenson et al.

[11] Patent Number: 5,966,373
[45] Date of Patent: Oct. 12, 1999

[54] WAVEFORM AND FRAME STRUCTURE FOR A FIXED WIRELESS LOOP SYNCHRONOUS CDMA COMMUNICATIONS SYSTEM

[75] Inventors: Philip L Stephenson, Salt Lake City; Thomas R Giallorenzi, Herriman; Johnny M Harris, Centerville; Lee A Butterfield; Michael J Hurst, both of Jordan; Dan M. Griffin, Bountiful; Rolf K. Thompson, Orem, all of Utah

[73] Assignee: L-3 Communications Corporation, New York, N.Y.

[21] Appl. No.: 08/988,026

[22] Filed: Dec. 10, 1997

[51] Int. Cl.[6] .......................... H04B 7/216; H04B 15/00; H04J 3/00; H04L 7/00
[52] U.S. Cl. .......................... 370/335; 370/342; 370/515; 375/200; 375/365
[58] Field of Search ..................... 375/200, 206, 375/208, 265, 244, 316; 370/335, 342, 206, 522, 474; 371/43.1, 43.4, 43.2, 52

[56] References Cited

U.S. PATENT DOCUMENTS

| | | | |
|---|---|---|---|
| 5,258,995 | 11/1993 | Su et al. | 370/206 |
| 5,267,244 | 11/1993 | Messerschmitt et al. | 370/342 |
| 5,293,379 | 3/1994 | Carr | 370/474 |
| 5,297,162 | 3/1994 | Lee et al. | 375/1 |
| 5,309,474 | 5/1994 | Gilhousen et al. | 375/1 |
| 5,357,541 | 10/1994 | Cowart | 375/206 |
| 5,359,624 | 10/1994 | Lee et al. | 375/1 |
| 5,396,518 | 3/1995 | How | 371/43.2 |
| 5,410,538 | 4/1995 | Roche et al. | 370/18 |
| 5,499,236 | 3/1996 | Giallorenzi et al. | 370/18 |
| 5,544,155 | 8/1996 | Lucas et al. | 370/18 |
| 5,568,473 | 10/1996 | Hemmati | 370/18 |
| 5,577,025 | 11/1996 | Skinner et al. | 370/22 |
| 5,583,853 | 12/1996 | Giallorenzi et al. | 370/441 |
| 5,604,732 | 2/1997 | Kim et al. | 370/342 |
| 5,751,761 | 5/1998 | Gilhousen | 375/200 |
| 5,757,767 | 5/1998 | Zehavi | 370/208 |
| 5,844,922 | 12/1998 | Wolf et al. | 371/43.1 |

Primary Examiner—Alpus H. Hsu
Assistant Examiner—Afsar M. Qureshi
Attorney, Agent, or Firm—Perman & Green, LLP

[57] ABSTRACT

Disclosed is a method for transmitting information in a CDMA communication system, the method including steps of (a) multiplexing data and control information into a data stream; (b) encoding the data stream to form a stream of encoded I/Q symbol pairs; (c) inserting synchronization information into the stream of encoded I/Q symbol pairs; and (d) spreading the encoded I/Q symbol pairs and the inserted synchronization information using a same pseudonoise (pn) spreading code prior to transmission as a frame. The preferred frame structure includes an unencoded synchronization field followed by a plurality of multi-byte data fields. Individual ones of the plurality of data fields are separated by a control message field. Individual ones of the control message fields contain a single byte of a multi-byte control message frame.

24 Claims, 5 Drawing Sheets

WAVEFORM AND FRAME STRUCTURE FOR A FIXED WIRELESS LOOP SYNCHRONOUS CDMA COMMUNICATIONS SYSTEM

FIELD OF THE INVENTION

This invention relates generally to wireless local loop systems and, in particular, a fixed wireless loop system providing voice and data communications between a radio base unit and a plurality of subscriber stations.

BACKGROUND OF THE INVENTION

Local loop by traditional definition is that portion of a network that connects a subscriber's home to a central office switch. This is, however, an expansive definition that does not hold true as the network extends into the local loop by means of Digital Loop Carrier and Digital Cross Connects. For the purposes of this invention, local loop is considered as the connection from the subscriber's premises to the connecting point in the network, whatever the nature of that connection may be.

Until recently the local loop was mostly based on copper plant supplemented by microwave radio links for remote areas or difficult terrain. Over the last decade fiber optics have made significant inroads into the local loop (also referred to as "access" network) reaching closer to subscriber homes and buildings. Sonet based access networks bring fiber to the curb. These fiber based solutions can provide very high bandwidth services, reliably and cost-effectively, in urban/metropolitan areas with significant numbers of business customers. In fact, most access providers in the U.S. have used such fiber based plant to provide access services to U.S. business customers.

The copper and fiber based solutions, while economical in many situations, still suffer from a number of drawbacks.

For example, in an area without an existing network infrastructure, it is very time consuming and expensive to build a new network. The expense is primarily in the labor, rights acquisition (for right of way or easement), and in electronics (for fiber based access). Overall the process is very slow due to extensive effort involved in acquiring right of way and in performing the required construction, aerial and/or underground. Also, in locations with extensive but congested existing infrastructure, it is often very expensive to add capacity due to already full ducts and cables, and sometimes impossible to add capacity without resorting to upgrading the entire system. In addition, wireline solutions tend to have costs that are distance sensitive, hence they are inherently unsuitable for sparse/scattered demand. Wireline networks are also not amenable to redeployment, which results in stranded assets when demand (consumer) moves. Wireline networks also cannot be rapidly deployed in emergency situations.

The term "fixed wireless loop", or FWL, connotes a fixed wireless based local access. However, it is often mixed with limited mobility solutions under the broader term "Radio Access". Irrespective of the type of radio technology, all fixed wireless or radio access systems use wireless means to provide network access to the subscriber. Broadly speaking, there are three main categories of fixed wireless solutions.

Fixed cellular systems are primarily based on existing analog cellular systems such as AMPS (in North America) or NMT (in Nordic countries).

Fixed cordless systems are primarily based on the European DECT standard using digital TDMA Time Division Duplex technology.

Bespoke systems are designed specifically for fixed wireless application. Conventional systems in this category are the analog microwave point to multi-point systems. More recently deployed systems operate at higher frequencies and employ digital technologies. These systems may be derived from similar cellular technologies, but are not based on any existing agreed upon standards.

Of the three main categories of fixed wireless systems there is no one solution that is clearly superior to others. If the primary need for a system operator is to provide voice oriented service wherein voice quality is not a limiting factor, then often a fixed cellular system is adequate, and even desirable because of its relatively low equipment cost. For very high density urban situations, a DECT solution may be desirable due to its high load carrying capacity and its pico-cellular architecture. Microwave solutions are best for sparse populations. Bespoke systems function well over a wide range of situations and have the best overall quality and desirable features, however they are likely to be more expensive, at least in the near future.

Most residential consumers in developing economies are mainly interested in adequate voice service. However, most business customers require data and fax service in addition to voice. With the growing popularity of home computers and Internet access, a need is arising to provide residential consumers with high speed data services at home. As such, the general trend is in the direction that all customers, both residential and business, will demand high quality voice and data services.

A problem that arises in conventional Code Division Multiple Access communications systems relates to system capacity constraints imposed by the finite number of available pseudonoise (pn) spreading codes. This problem is compounded when two pn codes are used in one channel for spreading (and despreading) the Inphase (I) and the Quadrature (Q) symbol pairs.

Another problem in conventional communication systems relates to the transmission of control messages. Typically, control messages are put on a queue for earliest transmission, and frame structures are typically designed to transmit all control messages for a particular frame in a single block either at the beginning or end of the frame. However, this approach adds a delay in order to transmit all control for a particular frame in a single block either at the beginning or end of the frame. For example, if a one byte message is at the top of the queue when a new frame ends, this message cannot be transmitted for an entire frame until the next block is ready to be sent. In this case, the delay would be an entire frame.

OBJECTS AND ADVANTAGES OF THE INVENTION

It is a thus a first object and advantage of this invention to provide an improved fixed wireless loop system that fulfills the foregoing and other needs and requirements.

It is a further object and advantage of this invention to provide an improved fixed wireless loop system that exhibits an improved use of pn codes, and that furthermore overcomes the control message related delay problem.

SUMMARY OF THE INVENTION

The foregoing and other problems are overcome and the objects and advantages are realized by methods and apparatus in accordance with embodiments of this invention.

Disclosed is a method for transmitting information in a CDMA communication system, the method including steps of (a) multiplexing data and control information into a data stream; (b) encoding the data stream to form a stream of encoded I/Q symbol pairs; (c) inserting synchronization information into the stream of encoded I/Q symbol pairs; and (d) spreading the encoded I/Q symbol pairs and the inserted synchronization information using a same pseudonoise (pn) spreading code prior to transmission as a frame.

The step of multiplexing forms a data stream having data fields comprised of a plurality of data bytes separated by control message fields each comprised of a single byte of a control message frame. The control message frame includes a control message header field, a plurality of control data fields, and a plurality of data integrity fields.

More particularly, the frame is comprised of an unencoded synchronization field followed by a plurality of data fields each comprised of a plurality of data bytes. Individual ones of the plurality of data fields are separated by a control message field. Individual ones of the control message fields are comprised of a single byte of the multi-byte control message frame.

In the preferred embodiment of this invention the step of encoding includes steps of (a) rate ½ convolutionally encoding the data stream to form an I channel and a Q channel; and (b) rate ⅘ punctured trellis coding the I and Q channels.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
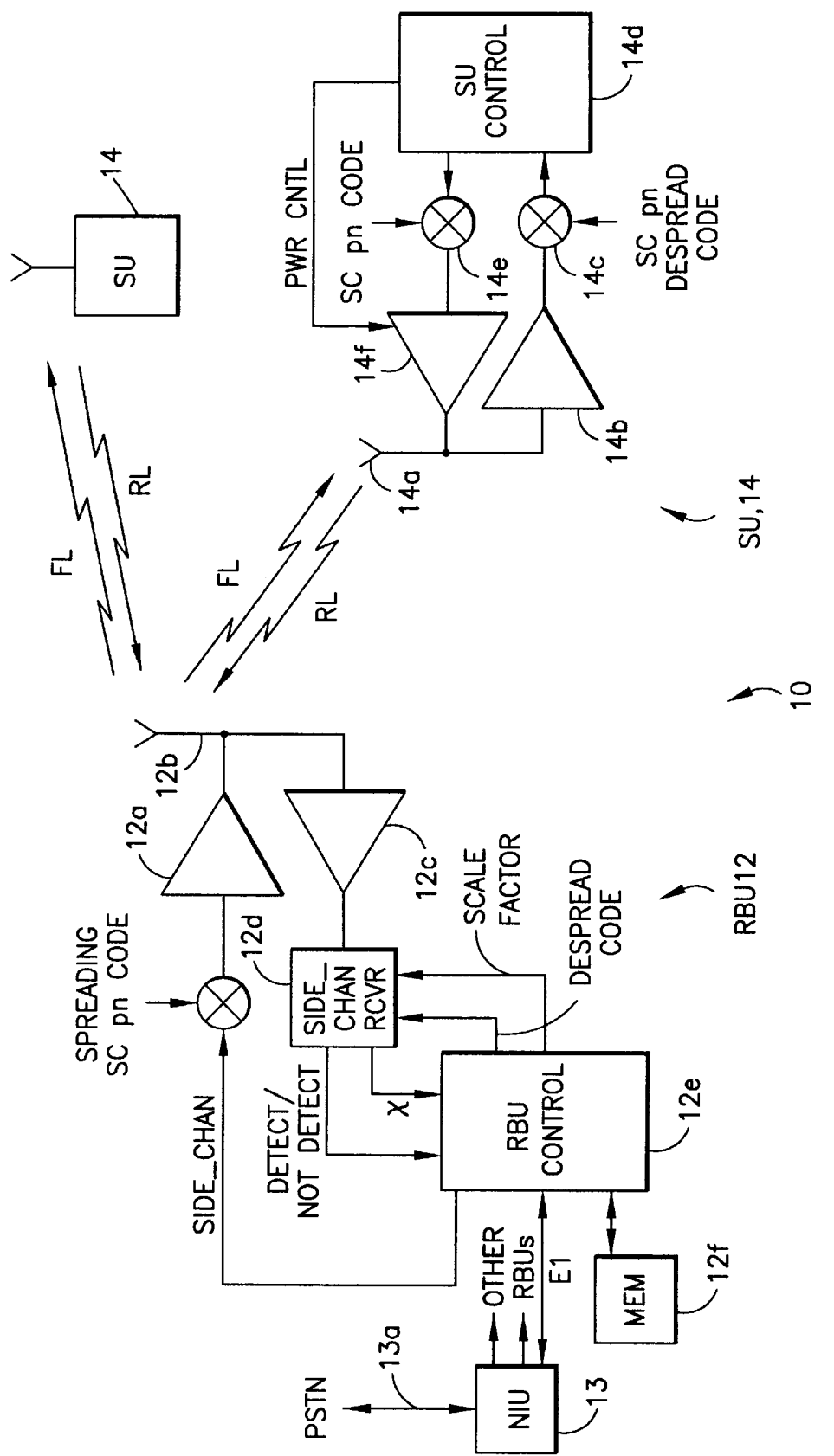
FIG. 1 is a simplified block diagram of a synchronous, DS-CDMA fixed wireless communications system in accordance with this invention, the system having a radio base unit (RBU) and a plurality of transceiver or subscriber units (SUs). The RBU transmits a side channel to the SUs, and also receives an essentially asynchronously transmitted side channel from the SUs.

By way of introduction, and referring to FIG. 1, a Fixed Wireless System (FWS) 10 in accordance with a preferred embodiment of this invention is a bespoke system based on digital radio technology. Specifically, the FWS 10 employs direct sequence spread spectrum based CDMA techniques over an air link to provide local access to subscribers. It offers very high quality, highly reliable service at costs that are very competitive with wireline solutions. The FWS 10 exhibits high spectral efficiency and thus can provide good wireline quality service with limited available bandwidth. A large dynamic range allows the FWS 10 to be deployable in a pico, micro, or mini cellular architecture meeting specific needs of dense metropolitan, urban, and suburban communities in an economical way.

Some important attributes of the FWS 10 include: wireline voice quality delivered at 32 Kbps; high throughput for data and fax applications with 32/64 Kbps throughput; high service reliability with good tolerance for noise and ingress; secure airlink; and support of enhanced services such as priority/emergency calling, both inbound and outbound.

The FWS 10 has a three to five times capacity advantage over conventional asynchronous CDMA technologies, and a three to seven times capacity advantage over currently available Time Division Multiple Access (TDMA) technology, due to its ability to use a frequency reuse of one.

The FWS 10 is a synchronous CDMA (S-CDMA) communications system wherein forward link (FL) transmissions from a radio base unit (RBU) 12 for a plurality of transceiver units, referred to herein as user or subscriber units (SUs) 14, are symbol and chip aligned in time, and wherein the SUs 14 operate to receive the FL transmissions and to synchronize to one of the transmissions. Each SU 14 also transmits a signal on a reverse link (RL) to RBU 12 in order to synchronize the timing of its transmissions to the RBU 12, and to generally perform bidirectional communications. The FWS 10 is suitable for use in implementing a telecommunications system that conveys voice and/or data between the RBU 12 and the SUs 14.

The SU 14 forms a portion of a Customer Premises Equipment (CPE). The CPE also includes a Network Termination Unit (NTU) and an Uninterruptible Power Supply (UPS), which are not illustrated in FIG. 1.

The RBU 12 includes circuitry for generating a plurality of user signals (USER_1 to USER_n), which are not shown in FIG. 1, and a synchronous side channel (SIDE_CHAN) signal that is continuously transmitted. Each of these signals is assigned a respective pn spreading code and is modulated therewith before being applied to a transmitter 12a having an antenna 12b. When transmitted on the FL the transmissions are modulated in phase quadrature, and the SUs 14 are assumed to include suitable phase demodulators for deriving in-phase (I) and quadrature (Q) components therefrom. The RBU 12 is capable of transmitting a plurality of frequency channels. By example, each frequency channel includes up to 128 code channels, and has a center frequency in the range of 2 GHz to 3 GHz.

The RBU 12 also includes a receiver 12c having an output coupled to a side channel receiver 12d. The side channel receiver 12d receives as inputs the spread signal from the receiver 12c, a scale factor signal, and a side channel despread pn code. These latter two signals are sourced from a RBU processor or controller 12e. The scale factor signal can be fixed, or can be made adaptive as a function of the number of SUs 14 that are transmitting on the reverse channel. The side channel receiver 12d outputs a detect/not detect signal to the RBU controller 12e for indicating a detection of a transmission from one of the SUs 14, and also outputs a power estimate value $\chi$, as described below. A read/write memory (MEM) 12f is bidirectionally coupled to the RBU controller 12e for storing system parameters and other information, such as SU timing phase information and power estimate values.

A Network Interface Unit (NIU) 13 connects the RBU 12 to the public network, such as the public switched telephone network (PSTN) 13a, through analog or digital trunks that are suitable for use with the local public network. The RBU 12 connects to the NIU 13 using E1 trunks and to its master antenna 12b using a coaxial cable. The SU 14 communicates with the RBU 12 via the radio interface, as described above.

In addition, the FWS 10 has an Element Management System or EMS (not depicted) that provides Operations, Administration, Maintenance, and Provisioning (OAM&P)

functions for the NIU 13 and RBU 12. The functioning of the EMS is not germane to an understanding of this invention, and will not be further described in any great detail.

The NIU 13 is the interface to the public network for the system 10. Its primary purpose is to provide the specific protocols and signaling that are required by the public network. These protocols can vary by country as well as by customer, and possibly even by the connecting point in the network.

In a preferred embodiment of this invention the NIU 13 can connect to a maximum of 15 RBUs 12 using one to four E1 connections per RBU 12, with four E1 connections being used for a fully populated RBU 12. In addition, each NIU 13 is sized for up to, by example, 10,000 subscribers. Time Slot 16 on each E1 trunk is used for passing control information between the NIU 13 and the attached RBUs 12, as well as for passing information to and from the controlling EMS. The protocol is based on the HDLC format and optimized to enhance RBU-NIU communication.

Specific functions provided by the NIU 13 include: initialization of the RBU 12; provisioning of dial tone and DTMF to the SUs 14; set up and tear down of voice and data calls; maintenance of Call Detail Record (CDR) data; HDLC Protocol (data link protocol to RBU Link Control Processor); billing system interface; Common Channel Signaling (CCS) for ringing and onhook/offhook detection; glare detection in NIU, RBU, and SU; call priority management; channel reassignment for calls in progress; detection of hook flash to enable plain old telephone service (POTS) and enhanced POTS calling features; 32/64 Kbps rate change initialization; pay phone capability (12/16 KHz tone detection, line reversal); priority and emergency number calling; accommodation of country specific signaling interfaces such as E&M, R1, R2, R2 variants, and C7; and system modularity: analog/digital options for both line side and trunk side.

The normal mode of operation for the SU 14 is a compressed speech mode using ADPCM encoding according to the ITU-T G.721 standard. This toll quality, 32 Kbps service is the default used whenever a non-X.21 channel is established with the RBU 12 (X.21 channels are configured a priori when provisioned by the EMS/NIU). The 32 Kbps channels may be used for voice band data up to 9600 b/s if desired. When the channel rate bumps to 64 Kbps PCM encoded voice/data due to detection of a fax/modem start tone, fax and modem rates of at least 33.6 Kbps are possible.

Figure 2:
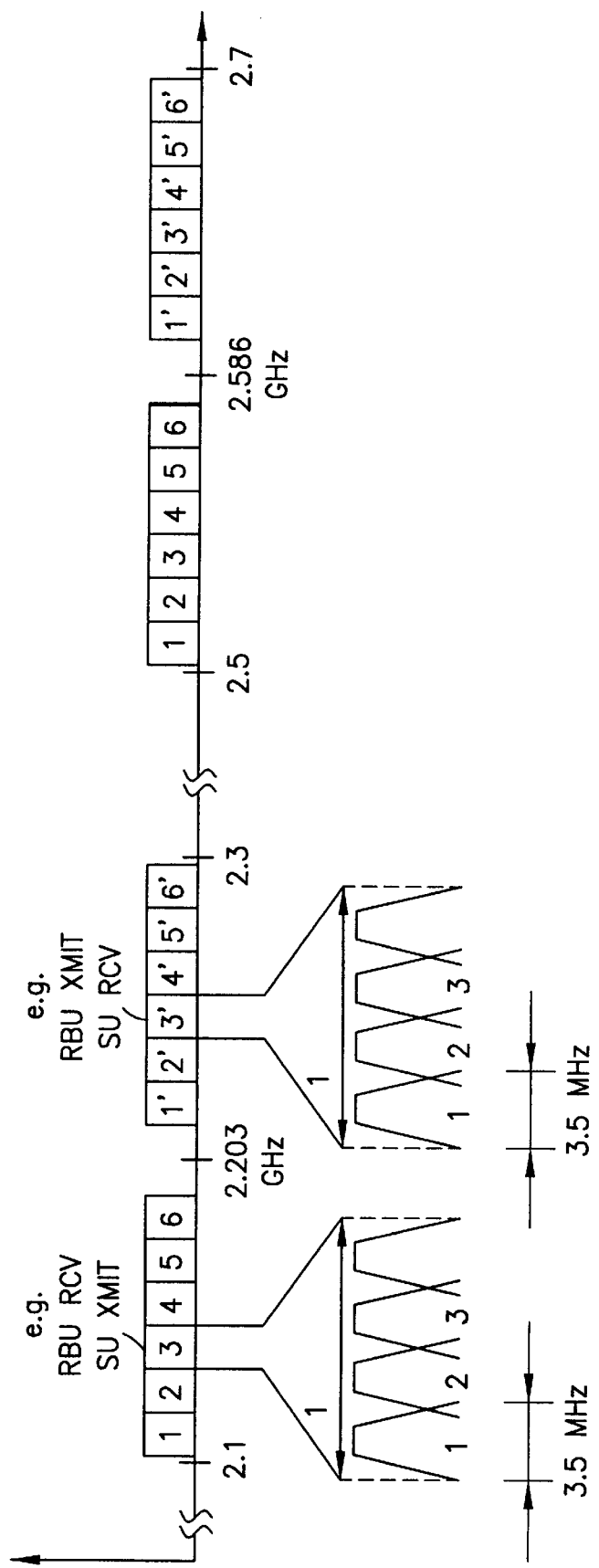
FIG. 2 is an exemplary frequency allocation diagram of the system of FIG. 1.

The SU-RBU air link provides a separate 2.72 MHz (3.5 MHz including guardbands) channel in each direction separated by either 91 MHz or 119 MHz of bandwidth. The nominal spectrum of operation is 2.1–2.3 GHz or 2.5–2.7 GHz. However, the system is designed such that the frequency can be varied from 1.8 to 5 GHz provided the spectral mask and separation between transmit and receive frequencies is maintained as per ITU 283.5 specification. As per the ITU 283.5 specification, there are a total of 96 frequency pairs allowed, as shown in FIG. 2. By example, the RBU 12 may transmit in the 3' frequency band and receive in the 3 frequency band, and the SU 14 transmits in the 3 frequency band and receives in the 3' frequency band.

The RBU 12 can support 128 simultaneous 34 Kbps channels using the 2.72 MHz bandwidth giving it a spectral efficiency of 1.6 bits/Hz. Of this total capacity, 8 channels are used by the FWS 10 and an additional 2 Kbps per channel is system overhead. Thus the effective traffic carrying capacity is 120 channels at 32 Kbps.

The spectral efficiency of the FWS 10 is three to five times that of conventional CDMA systems primarily because the FWS 10 employs bi-directional Synchronous CDMA. Competing systems, including those based on IS-95, are asynchronous or synchronous only in one direction. The bidirectional synchronicity permits the FWS 10 to use near orthogonal spreading codes and gain maximum possible data carrying capacity.

Radio emissions lose energy as they travel in air over long distances. In order to ensure that the received signal energy from a distant subscriber is not completely overwhelmed by that of a near subscriber, the RBU 12 controls the power level of the SUs 14. In the preferred embodiment only the reverse channel power (from SU 14 to the RBU 12) is controlled by the RBU 12. The power control is primarily established at SU 14 initialization.

Subsequent power adjustments are infrequent and are made in response to transient environmental conditions. The closed loop power control is implemented by comparing against a desired power level and making incremental adjustments until the desired level is achieved.

The forward channel power control is not needed since each SU 14 receives its entire signal at only one level. The RBU 12 merely needs to ensure that the received signal strength by the farthest SU 14 is sufficient for its application.

It is not always desirable to have an extended range. In a dense urban or even a suburban setting, one needs to deploy the system in a cellular architecture as depicted below. To reduce interference between sectors and between cells in such a deployment, the range of the RBU is limited overall as well as selectively in specific directions. Such range control may be accomplished using a directional master antenna 12b at the RBU 12, as well by controlling overall RBU power.

When one of the SUs 14 detects an off-hook (the user has picked up the phone), it transmits an outgoing call request on one of six reverse synchronous side channels in a Slotted ALOHA fashion. The side channel is chosen at random. The RBU 12 processes the request and, providing an active channel is available, sends an outgoing call reply to the SU 14 which contains the active channel codes (both forward and reverse). In the meantime, the RBU 12 begins to transmit forward side channel data on the newly activated channel and at a given time, begin to transmit the active call data. The SU 14, which is listening to the forward side channel, receives the active channel assignment and switches at a superframe boundary to the active codes. The SU 14 then begins to receive the side channel data and then the active call data.

When an incoming call is received by the NIU 13 for one of the SUs 14 in the local loop, the RBU 14 is notified over the E1 link. The RBU 12 first checks to determine if the intended SU 14 is busy. If not, the RBU 14 sends a message to the SU 14 on the forward side channel, the message containing the active channel codes. The call processing then continues in the same manner as the outgoing call processing discussed above.

If all channels are busy and the NIU 13 receives an incoming call for a non-busy SU 14, it provides a subscriber busy tone to the caller unless the called SU has priority inbound access (such as a hospital, fire station, or police), in which case the NIU 13 instructs the RBU 12 to drop the least priority call to free up a channel for the called SU 14. Similarly, if an SU 14 initiates a request for service and no traffic channels are open, then the RBU 12 provides the dial tone on a temporary traffic channel and receives the dialed number. If the dialed number is an emergency number the RBU 12 drops a least priority call to free up a traffic channel and connects the free channel to the SU 14. If the called number is not an emergency number then the SU 14 is provided a special busy tone indicating a "wait for service" condition.

Figure 3:
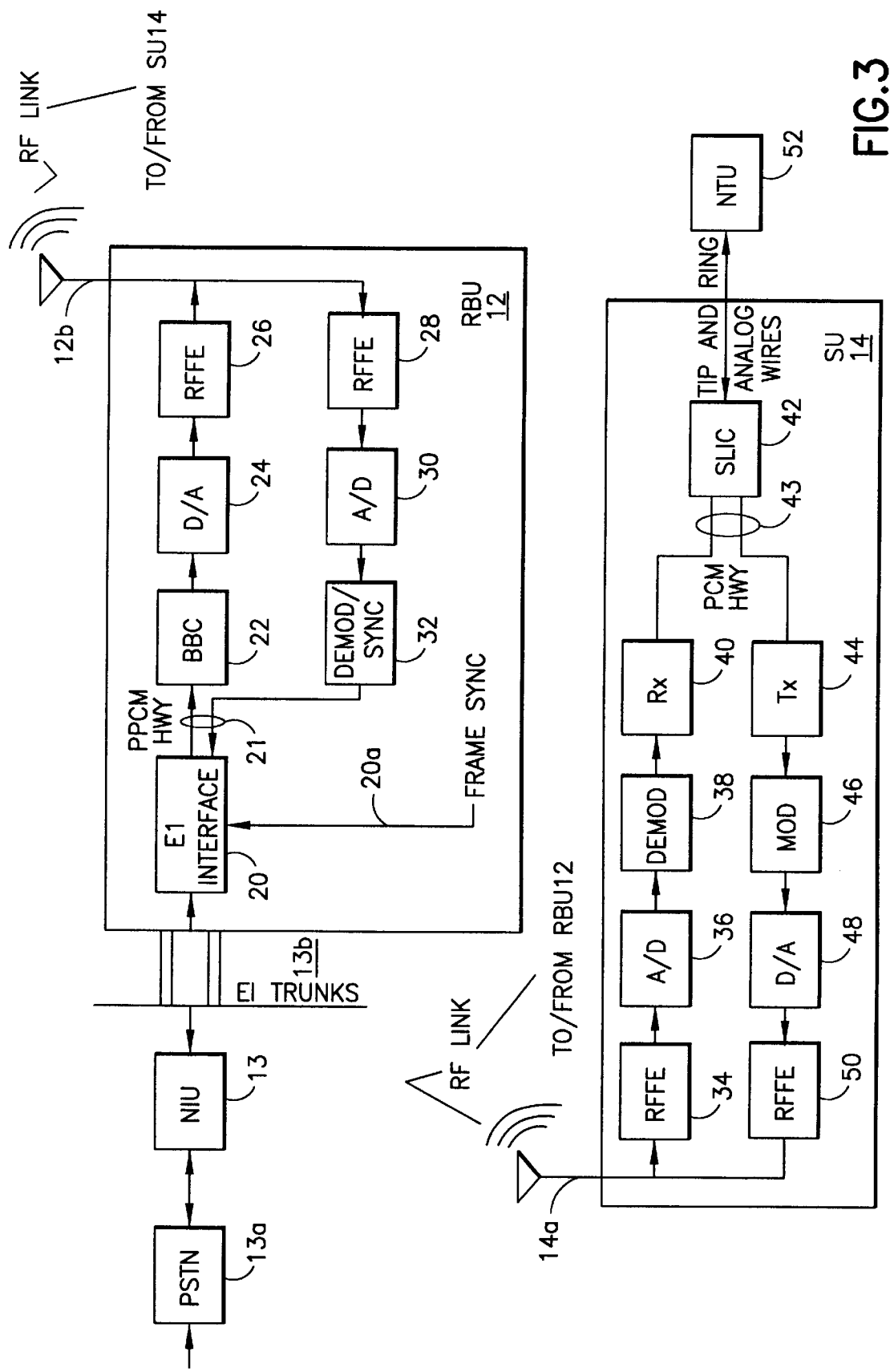
FIG. 3 is a block diagram illustrating the RBU and SU of FIG. 1 in greater detail.

Reference is now made to FIG. 3 for illustrating the RBU 12 and SU 14 in greater detail.

An incoming call from the PSTN 13a passes through the NIU 13 to 64 Kbps per channel E1 trunks 13b and then to a RBU-resident E1 interface 20. The E1 interface 20 optionally performs an A-Law ADPCM algorithm for the compression of the 64 Kbps channel to a 32 Kbps channel that is placed on a PPCM highway 21 time slot. If the A-Law ADPCM compression is bypassed, the 64 Kbps channel is split into two 32 Kbps channels and placed onto the PPCM Highway 21. In the preferred embodiment the RBU 12 can accommodate up to 128 32 Kbps channels, and each SU 14 can accommodate up to four 32 Kbps channels. The PPCM Highway 21 operates in conjunction with a frame synchronization (FrameSync) signal 20a, which represents a master timing pulse that is generated every 16 ms. All calls to and from the RBU 12 pass through the PPCM Highway 21 and the E1 interface 20. For the case of an incoming call the signal is applied to a baseband combiner (BBC) 22 and thence to a D/A converter 24 and a transmit radio frequency front-end (RFFE) 26 before being applied to the antenna 12b for transmission to the SU 14. At the SU 14 the incoming call signal is received by the antenna 14a and is applied to a receive RFFE 34, an A/D 36, demodulator 38 and a receiver 40. The SU 14 includes a subscriber line interface circuit (SLIC) 42 that couples a pulse code modulation (PCM) Highway 43 to a network termination unit (NTU) 52. In the reverse direction a call originates at the NTU 52 and passes through the SLIC 42 and PCM Highway 43 to a transmitter 44, modulator 46, D/A converter 48 and a transmit RFFE 50. The signal is applied to the SU antenna 14a and is received by the RBU antenna 12b. The received signal is applied to a receive RFFE 28, A/D converter 30, a demodulator and synchronization unit 32, and then to the PPCM Highway 21 and E1 interface 20 for connection to the PSTN 13a via one of the E1 trunks 13b and the NIU 13.

The RBU 12 controls the master timing for the entire FWS 10. Timing throughout the FWS 10 is referenced to the periodic timing pulse generated at the PPCM Highway 21, i.e., to the FrameSync signal 20a. In the FWS 10 all data is grouped into equal-sized packets referred to as frames, which in turn are grouped into super-frames with, for example, three frames making up one super-frame.

Figure 5A:
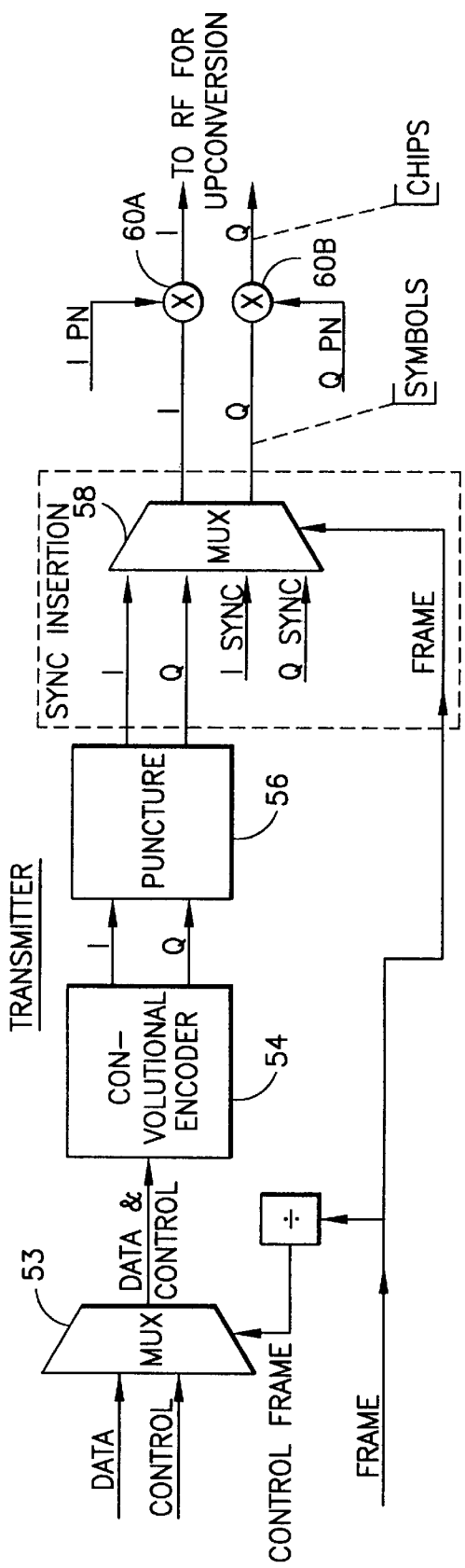
FIGS. 5A and 5B illustrate portions of the RBU transmit and receiver circuitry, respectively, in greater detail.
Figure 5B:
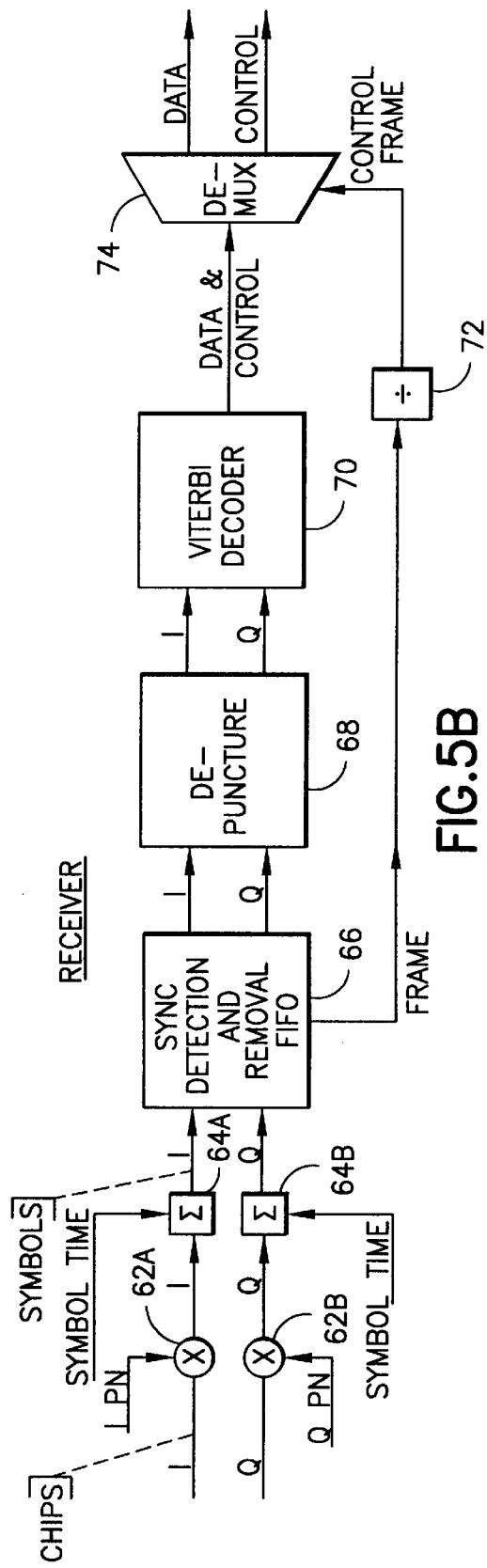

Reference is now made to FIGS. 5A and 5B for illustrating the presently preferred S-CDMA waveform generation circuitry. In the RBU 12 both data (32 Kbps) and control messages (1.5 Kbps) are multiplexed into a single bit stream (34 Kbps) using a multiplexer (MUX) 53. The data stream is rate ½ convolutionally encoded at block 54 and then punctured to ⅘ths (a rate ⅘ punctured trellis code) in block 56 thereby producing I and Q symbol pairs. Un-encoded SYNC words (312.5 symbols/sec, I SYNC and Q SYNC) are then inserted at the beginning of each frame in the SYNC insertion MUX 58. The resulting I/Q symbol pairs (21.25 K symbols/sec) are spread in spreaders 60A and 60B, respectively, using, in accordance with an aspect of this invention, identical pn codes for both I and Q. The resulting chip waveform (2.72 M chips/sec) is then presented to the D/A converter 24 and transmit RFFE 26 where the waveform is upconverted to the transmit frequency.

The waveform is identical for both the Forward (downlink) and Reverse (uplink) channels, except that in the forward direction every third sync word is inverted. The inverted sync word enables the SU 14 to determine where superframe boundaries occur. In the reverse direction the sync words are not inverted, as the RBU 12 already has knowledge of where the superframe boundaries occur. The reverse channel is, however, superframe synchronous so that the side channels can operate using a slotted ALOHA multiple access protocol. The reverse channel side channel bursts always begin and end on superframe boundaries.

The RF receiver of FIG. 5B downconverts the received signal to baseband. The baseband signal is despread in despreaders 62A and 62B, again using identical pn codes, and accumulated in accumulators 64A and 64B for a symbol period, resulting in I and Q soft symbol decisions. The I/Q soft decisions are presented to a SYNC detection and removal circuit block 66. This circuitry of block 66 generates a Frame synchronization signal that is used by a depuncture block 68 and a Viterbi decoder 70 for frame synchronization. The I/Q soft decisions are presented to the depuncture block 68 where punctured data is reinserted. The I/Q output of depuncture block 68 is input to the Viterbi decoder 70 which accepts I/Q symbols and outputs received Data and Control. From the Frame synchronization signal, a Control Frame synchronization signal is generated by block 72. This signal is used by demultiplexer (DEMUX) 74 to separate the Data from the Control messages.

By using the same pn codes for both the I and Q channels the capacity of the FWS 10 is doubled when compared to a system that uses separate I and Q pn codes.

Figure 4:
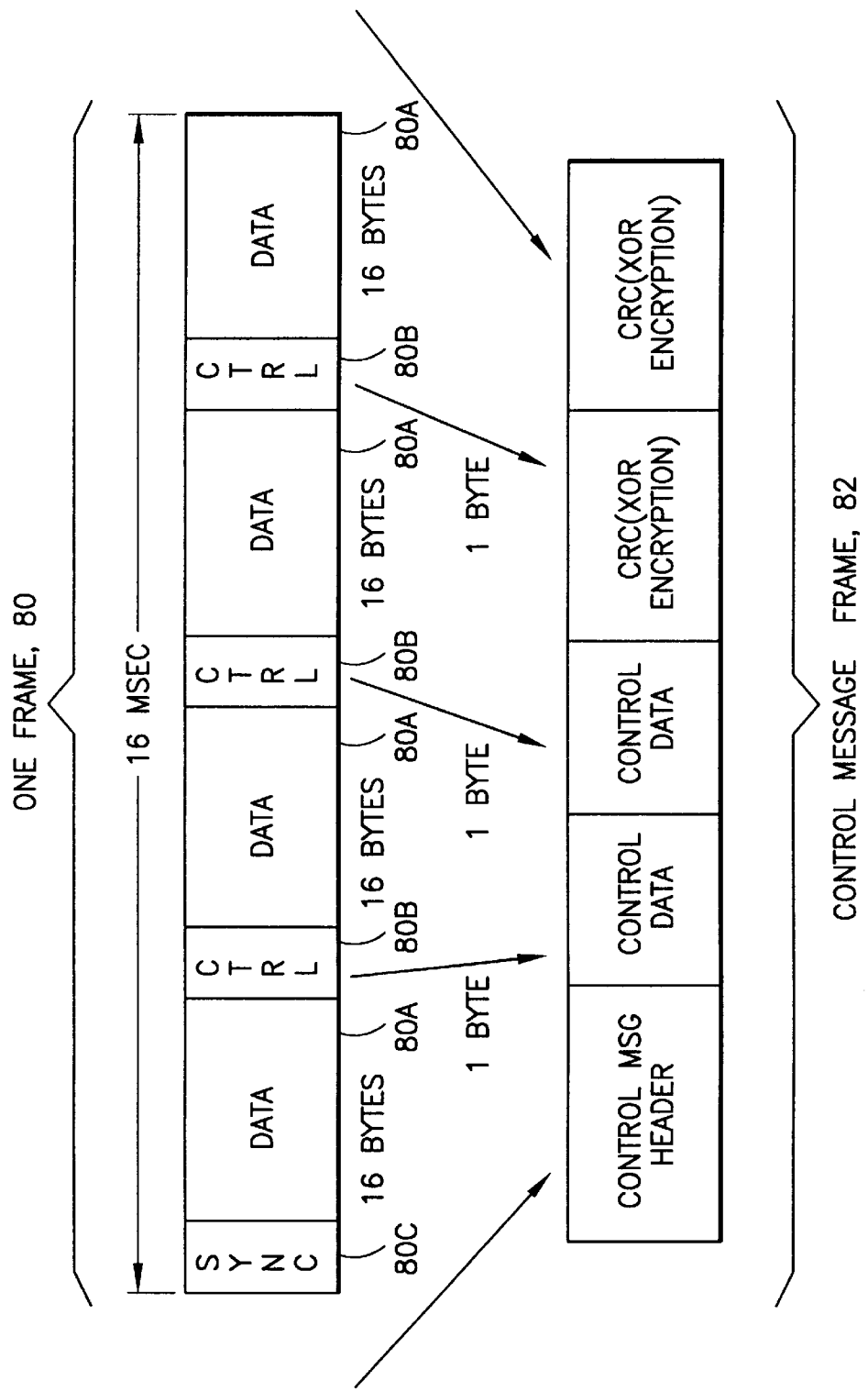
FIG. 4 illustrates a presently preferred frame structure having data fields interspersed with control message frame fields.

Referring to FIG. 4, Data and Control messages are contained in 16 ms frames 80. Each 16 ms frame 80 is comprised of four, 16-byte blocks or fields of data 80A and three 1-byte control (CTRL) blocks or fields 80B. A single control message frame 82 is comprised of a plurality of one-byte fields, specifically a control message header field which can be used to identify a type of control message, two control data fields, and two CRC (XOR encryption) data integrity fields. The number of fields may be varied. The control message frame 82 requires more than one data frame 80 to be completely transmitted. Each data frame 80 begins with a 1-byte synchronization (SYNC) word 80B. The SYNC word 80C is not encoded. Rather, it is inserted at the symbol rate in the SYNC insertion MUX 58, after puncturing, and is removed in the SYNC detection and removal block 66 before depuncturing and decoding. The SYNC word 80C is used by the RBU receiver to obtain frame synchronization. The SYNC word 80C is also used by the Viterbi decoder 70 to resolve any I/Q phase ambiguity resulting from the up and down conversion at RF.

As was discussed earlier, in conventional approaches the control messages are put on a queue for earliest transmission, and the frame structures are typically designed to transmit all control for a particular frame in a single block either at the beginning or end of the frame. However, this approach adds a delay to transmit all control for a particular frame in a single block either at the beginning or end of the frame, and thus adds delay to messages and telephony data at the receiver.

In accordance with the frame structure shown in FIG. 4 a control message does not have to be delayed by an entire frame. Instead, it can be transmitted in the first of three 1 byte control blocks that are interspersed with the frame data fields 80A, resulting in a significant reduction in latency. This also has the effect of minimizing the delay experienced by the telephony data. That is, by sending the control messages in "packets" within the data frame 80, the telephony data experiences less delay. This feature enables the FWS 10 to implement tighter control loops as well as to decrease the time required to establish and tear-down channels.

While the invention has been particularly shown and described with respect to preferred embodiments thereof, it will be understood by those skilled in the art that changes in form and details may be made therein without departing from the scope and spirit of the invention.

What is claimed is:

1. A method for transmitting information in a Code Division Multiple Access communication system, comprising steps of:

multiplexing data and control information into a data stream;

encoding the data stream to form a stream of encoded I/Q symbol pairs;

inserting synchronization information into the stream of encoded I/Q symbol pairs; and spreading the encoded I/Q symbol pairs and the inserted synchronization information using a same pseudonoise (pn) spreading code prior to transmission as a frame, wherein the frame is comprised of an unencoded synchronization field followed by a plurality of data fields each comprised of a plurality of data bytes, individual ones of said plurality of data fields being separated by a control message field each of which is comprised of a single byte of a multi-byte control message frame.

2. A method as in claim 1, wherein the control message frame is comprised of a control message header field, a plurality of control data fields, and at least one data integrity field.

3. A method as in claim 1, wherein the step of encoding includes steps of:

rate ½ convolutionally encoding the data stream to form an I channel and a Q channel; and rate ⅘ puncturing the convolutionally encoded I and Q channels.

4. A method for transmitting information in a Code Division Multiple Access communication system, comprising steps of:

multiplexing data and control information into a data frame having data fields comprised of a plurality of data bytes separated by control message fields each comprised of a single byte of a multi-byte control message frame;

encoding the data frame;

inserting an unencoded frame boundary synchronization field into the data frame;

spreading the data frame using a spreading code; and transmitting the spread data frame to a receiver.

5. A method as in claim 4, and further comprising steps of:

receiving and despreading the transmitted data frame;

synchronizing to the synchronization field;

decoding the data frame; and demultiplexing the data fields from the control message fields.

6. A method as in claim 5, wherein the control message frame includes a control message header field, a plurality of control data fields, and a plurality of data integrity fields.

7. A method as in claim 4, wherein the step of encoding includes steps of:

rate ½ convolutionally encoding the data frame to form an I channel and a Q channel; and rate ⅘ punctured trellis coding the I and Q channels.

8. A synchronous CDMA fixed wireless system comprised of a radio base unit (RBU) coupled to a telecommunications network and to a plurality of subscriber units (SUs) that communicate over CDMA radio channels, said RBU comprising:

a first multiplexer for multiplexing data and control information intended for one SU into a data frame having data fields comprised of a plurality of data bytes separated by control message fields each comprised of a single byte of a multi-byte control message frame;

an encoder for encoding the data frame and forming encoded I/Q symbol pairs;

a second multiplexer for inserting unencoded I/Q symbol pairs of a frame boundary synchronization field into the encoded I/Q symbol pairs to form a multiplexed I/Q symbol pairs stream;

a spreader for spreading the multiplexed I/Q symbol pairs stream using one pn spreading code; and a transmitter for transmitting the spread multiplexed I/Q symbol pairs stream as a frame to the intended SU.

9. A system as in claim 8, wherein the said encoder comprises:

a rate ½ convolutional encoder; and a rate ⅘ punctured trellis coder.

10. A system as in claim 8, wherein said transmitted frame is comprised of the unencoded frame boundary synchronization field followed by a plurality of data fields each comprised of a plurality of data bytes, individual ones of said plurality of data fields being separated by a control message field each of which is comprised of a single byte of a multi-byte control message frame.

11. A method for transmitting information in a Code Division Multiple Access communication system, comprising steps of:

multiplexing data and control information into a data frame having data fields comprised of a plurality of data bytes separated by control message fields each comprised of a single byte of a multi-byte control message frame;

encoding the data frame;

inserting unencoded frame boundary synchronization information into the data frame;

spreading the data frame; and transmitting the spread data frame to a receiver;

wherein the unencoded frame boundary synchronization information is inserted in an inverted form at every N frame boundaries to indicate a superframe boundary.

12. A method as in claim 11, wherein N=3.

13. A method as in claim 11, wherein the step of inserting the unencoded frame boundary synchronization information in an inverted form at every N frame boundaries is performed only in a forward direction from a radio base unit to a subscriber unit.

14. A method as in claim 11, wherein the unencoded frame boundary synchronization information is comprised of an In-phase (I) channel synchronization word and a Quadrature (Q) channel synchronization word.

15. A method as in claim 11, and further comprising steps of:

receiving and despreading the transmitted data frame;

synchronizing to the unencoded frame boundary synchronization information;

decoding the data frame; and demultiplexing the data fields from the control message fields.

16. A method as in claim 15, wherein the control message frame includes a control message header field, a plurality of control data fields, and at least one data integrity field.

17. A method as in claim 11, wherein the step of encoding includes steps of:

rate ½ convolutionally encoding the data frame to form an In-phase (I) channel and a Quadrature (Q) channel; and rate ⅘ puncturing the I and Q channels.

18. A method as in claim 11, wherein the step of spreading uses a same spreading code for the I channel and for the Q channel.

19. A method as in claim 11, wherein a frame is comprised of four, 16-byte blocks of data and three, 1-byte control blocks individual ones of which are separated from one another by one of the 16-byte blocks of data, wherein a single control message is comprised of a plurality of the 1-byte fields and is comprised of a control message header field for identifying a type of control message, at least one control data field, and at least one control data integrity field.

20. A method as in claim 11, wherein the frame boundary synchronization information is comprised of a synchronization word that is inserted at the symbol rate after frame coding and puncturing, and which is removed before frame depuncturing and decoding.

21. A synchronous CDMA fixed wireless system comprised of a radio base unit (RBU) coupled to a telecommunications network and to a plurality of subscriber units (SUs) that communicate over CDMA radio channels, said RBU comprising:

a first multiplexer for multiplexing data and control information intended for one SU into a data frame having data fields comprised of a plurality of data bytes separated by a control message field comprised of a single byte of a multi-byte control message frame;

an encoder for encoding the data frame and forming encoded In-phase channel and Quadrature channel (I/Q) symbol pairs;

a second multiplexer for inserting unencoded I/Q symbol pairs of a frame boundary synchronization field into the encoded I/Q symbol pairs to form a multiplexed I/Q symbol pairs stream;

a spreader for spreading the multiplexed I/Q symbol pairs stream using one pn spreading code; and a transmitter for transmitting the spread multiplexed I/Q symbol pairs stream as a frame to the intended SU, wherein the frame boundary synchronization field is inserted in an inverted form at every N frame boundaries to indicate a superframe boundary.

22. A system as in claim 21, wherein N=3.

23. A system as in claim 21, wherein the frame boundary synchronization field is comprised of an In-phase channel synchronization word and a Quadrature channel synchronization word.

24. A system as in claim 21, wherein the frame boundary synchronization field is further used by a receiver decoder to resolve I/Q phase ambiguities.

* * * * *